United States Patent [19]  [11]  4,406,705
Oeder et al. [45] Sep. 27, 1983

[54] HARD WAXES COMPRISING TERPOLYMERS OF ETHYLENE WITH UNSATURATED CARBOXYLIC ACIDS AND UNSATURATED CARBOXYLIC ACID ESTERS

[75] Inventors: Dieter Oeder, Weisenheim; Wolfram Dietsche, Frankenthal; Stefan Weiss, Neckargemuend; Walter Ziegler, Edingen; Albert Hettche, Hessheim, all of Fed. Rep. of Germany

[73] Assignee: BASF Aktiengesellschaft, Ludwigshafen, Fed. Rep. of Germany

[21] Appl. No.: 349,159

[22] Filed: Feb. 16, 1982

[30] Foreign Application Priority Data

Mar. 14, 1981 [DE] Fed. Rep. of Germany ....... 3109950

[51] Int. Cl.$^3$ ............................................. C08L 91/06
[52] U.S. Cl. .................................. 106/270; 106/271
[58] Field of Search ................ 106/270, 271; 526/317, 526/916

[56] References Cited

U.S. PATENT DOCUMENTS 3,658,741  4/1972  Knutson et al. ................... 523/309
3,909,280  9/1975  Dench et al. ....................... 106/271
3,963,772  6/1976  Takeshita ............................ 560/81

FOREIGN PATENT DOCUMENTS 963380 of 0000 United Kingdom .

*Primary Examiner*—Theodore Morris
*Attorney, Agent, or Firm*—Oblon, Fisher, Spivak, McClelland & Maier

[57] ABSTRACT

Water-emulsifiable hard waxes consisting of homogeneous terpolymers of ethylene with—based on weight of terpolymer—from 1 to 8% by weight of $C_3$-$C_8$-olefinically unsaturated carboxylic acids and from 0.5 to 10% by weight of $C_1$-$C_{12}$-alkyl esters of such unsaturated carboxylic acids and having a Staudinger index, determined according to DIN 53,728, of from 5 to 55, an acid number of from 8 to 62 and a Höppler hardness, measured by DFG standard method M-III-9a(57), at 23° C., of from 250 to 800 bar, are obtained by copolymerizing ethylene with olefinically unsaturated $C_3$-$C_8$-carboxylic acids and esters of such acids with $C_1$-$C_{12}$-alkanols in a continuous process in the presence of a free radical initiator at from 150° to 300° C. under a pressure of from 1,000 to 3,000 bar, using a weight ratio of ethylene:acid:acrylate of from 500:1:1 to 20:1:1, in a one-phase polymerization medium in which the monomers are soluble, in the presence of from 0.01 to 8% by weight, based on the sum of the monomers, of a regulator, from 3 to 25% by weight of the ethylene being converted and the copolymer formed being removed continuously from the reaction zone.

2 Claims, No Drawings

HARD WAXES COMPRISING TERPOLYMERS OF ETHYLENE WITH UNSATURATED CARBOXYLIC ACIDS AND UNSATURATED CARBOXYLIC ACID ESTERS

The present invention relates to novel hard waxes which consist of terpolymers of ethylene, olefinically unsaturated carboxylic acids and esters of these unsaturated carboxylic acids. Compared to standard waxes, the novel waxes have greater heat stability and stability to alkali and improved emulsifying properties, and, as high molecular weight waxes, improve the gloss and toughness of polishes.

Conventional emulsifiable polyethylene waxes are obtained by melt oxidation of low molecular weight non-emulsifiable polythylene waxes. The large number of publications on this topic includes, inter alia, German Published Applications DAS No. 1,180,131, DAS No. 1,645,411 and DAS No. 1,237,783, U.S. Pat. No. 2,952,649 and French Pat. No. 1,343,962.

However, this group of waxes has the disadvantage that they are not defined chemical compounds. The melt oxidation results in the incorporation, into the polymer molecule, not only of the carboxyl groups required for emulsification, but also of hydroxyl groups, carbonyl groups and peroxide groups. This results in thermal instability, sensitivity to alkali, and discoloration on conversion to an emulsion, or during use.

A further group of waxes, which are chemically defined materials, are the copolymers of ethylene and acrylic acid, as described in German Published Application DAS No. 1,720,232. These products in turn have the disadvantage that their emulsifying properties are less good than those of the products obtained by melt oxidation. Furthermore, acrylic acid contents of >4.5% are required for products with good emulsifying properties.

Telomer waxes of ethylene, acrylic acid and vinyl acetate are described in German Laid-Open Application DOS No. 2,233,360. However, as is familiar enough to a skilled worker, the presence of vinyl acetate once again results in a marked deterioration of the heat stability and stability to hydrolysis.

It is an object of the present invention to provide waxy terpolymers which in addition to being colorless and odorless are heat-stable and stable to hydrolysis, have good emulsifying properties even at a very low acid content, give stable emulsions and impart toughness and scratch resistance to polymer films.

We have found that this object is achieved by providing terpolymers as defined in the patent claims, and having the following characteristics: a Staudinger index, determined according to DIN 53,728, of from 5 to 55, an acid number of from 8 to 62 and a Höppler hardness, measured by DFG standard method M-III-9a(57), at 23° C., of from 250 to 800 bar.

The terpolymers contain, as polymerized units, from 1 to 8, preferably from 2 to 6, % by weight of an α-olefinically unsaturated $C_3$–$C_8$-carboxylic acid and from 0.5 to 10, preferably from 1 to 8, % by weight of an ester of an unsaturated $C_3$–$C_8$-carboxylic acid with an alcohol of from 1 to 12, preferably from 1 to 6, carbon atoms.

The products containing, as polymerized units, from 2.5 to 5% by weight of carboxylic acid and from 2 to 6% by weight of a carboxylic acid ester of an alcohol of 2 to 4 carbon atoms are of particular industrial interest.

Examples of suitable acids for the purposes of the invention are acrylic acid, melthacrylic acid, crotonic acid, maleic acid, fumaric acid and itaconic acid; in industrial practice, acrylic acid and methacrylic acid are preferred.

Examples of suitable esters for the purposes of the invention are methyl acrylate, ethyl acrylate, propyl acrylate, butyl acrylate, pentyl acrylate, hexyl acrylate, heptyl acrylate, octyl acrylate, nonyl acrylate, methyl methacrylate, ethyl methacrylate, butyl methacrylate, hexyl methacrylate, octyl methacrylate, methyl crotonate, ethyl crotonate, butyl crotonate, dimethyl maleate, diethyl maleate, diethyl fumarate, dibutyl fumarate and dibutyl itaconate.

In addition to the above carboxylic acids and their esters, the corresponding monoalkyl maleates and fumarates can be employed.

In industrial practice, melthyl acrylate, ethyl acrylate, butyl acrylate, methyl methacrylate, ethyl methacrylate, butyl methacrylate, monomethyl maleate, monoethyl maleate and monobutyl maleate are preferred. The copolymers have Staudinger indices of from 5 to 55 units (determined according to DIN 53,728).

The Höppler hardness is from 250 to 800 bar, measured at 23° C. by DFG standard method M-III-9a(57), preferably from 270 to 650 bar.

The acid numbers are from 8 to 62, preferably from 20 to 40, i.e. lower than in prior art products.

In comparable waxes of the prior art (namely ethylene/acrylic acid copolymers), higher acid numbers were required to obtain non-creaming, speck-free and transparent emulsions, as is shown by the experimental results given below.

It is true that the products obtained by air oxidation have lower acid numbers, but because of the disadvantages described at the outset these products tend to discoloration, even in emulsions.

The waxes are prepared in a conventional manner by continuous high pressure copolymerization of ethylene with the unsaturated carboxylic acids and carboxylic acid esters in the presence of a free radical initiator, at from 150° to 300° C. under a pressure of from 1,000 to 3,000 bar. The weight ratio of ethylene:unsaturated carboxylic acid:carboxylic acid ester is from 500:1:1 to 20:1:1, and the batch contains from 0.01 to 8% by weight, based on the sum of the monomers, of a regulator.

From 3 to 25% by weight of the ethylene are converted continuously and the polymer formed is continuously removed from the reaction zone.

In preparing the hard waxes it is important to choose the correct dosage of acrylic acid, acrylate, regulator and initiator, since otherwise the product may shown such disadvantages as too high a molecular weight, poor emulsifying characteristics, low hardness and, accordingly, poor film properties.

A process which at first sight is very similar is disclosed in German Published Application DAS No. 1,520,497. This process is also carried out continuously, but without addition of a regulator and preferably in the presence of a solvent such as benzene. However, it give products which have adhesive properties and may be used, for example, as fiber binders, i.e. the products are unsuitable for use as hard waxes, which are intended to give a non-tacky film.

It was therefore surprising that a similar chemical process should permit the preparation of products having such different performance characteristics.

As stated, the products are obtained by continuously copolymerizing the ethylene with the ethylenically unsaturated acid and the acid ester at a high ethylene pressure, namely from 1,000 to 3,000 bar, at from 150 to 300° C. The polymerization takes place in a one-phase medium, with ethylene conversions of at most 25%, the ethylene present in the supercritical state serving as a solvent for the reaction mixture and for the polymer melt. An additional solvent is not needed. The ethylenically unsaturated acids and the acid esters must be dosed into the reaction mixture separately from the free radical initiator employed. The regulator required to obtain the desired molecular weight can be dosed in together with the comonomers or with the free radical initiator.

The regulator employed is a conventional substance of this type, for example an aliphatic aldehyde of 3 to 6 carbon atoms, e.g. propionaldehyde or n-butyraldehyde, or an aliphatic ketone of 3 to 6 carbon atoms, e.g. ketone (sic—?acetone) or methyl ethyl ketone. From 0.01 to 8, preferably from 0.1 to 5, % by weight, based on the sum of the monomers, of regulator is employed.

The Examples which follow illustrate the invention without implying any limitation.

EXAMPLE 1

A mixture of 320 kg/h of ethylene, 2.5 kg/h of acrylic acid, 1.3 kg/h of n-butyl acrylate and 0.57 kg/h of propionaldehyde, at 35° C., was passed continuously into a 15 liter stirred autoclave kept at a pressure of 2,300 bar. The temperature in the autoclave was kept at 240° C. by continuous addition of 26.6 g/h of tert.-butyl perisononanate, as a rule in a suitable solvent. The polymer was obtained in an amount of 56.6 kg/h by letting down the reaction mixture; this corresponds to a conversion of 17.7%, based on ethylene throughput. The polymer contained 4.1% by weight of acrylic acid and 2.0% by weight of n-butyl acrylate as copolymerized units. The Staudinger index of the product was 27.5 units.

Examples 2 to 16, shown below, are carried out by a procedure similar to that of Example 1; the different conditions of preparation and product parameters are summarized in Table 1.

TABLE 1

| Example No. | AA content (% by weight) | n-BA content (% by weight) | 2-ethylhexyl acrylate content (% by weight) | Methyl acrylate content (% by weight) | Pressure bar | $T_{max}$ (°C.) | $T_{min}$ (°C.) | Ethylene throughput (kg/h) | AA dosage rate (kg/h) | n-BA dosage rate (kg/h) |
|---|---|---|---|---|---|---|---|---|---|---|
| 1 | 4.1 | 2.0 | — | — | 2,300 | 240 | 35 | 320 | 2.6 | 1.3 |
| 2 | 3.5 | 3.0 | — | — | 2,300 | 240 | 35 | 307 | 2.1 | 1.9 |
| 3 | 2.9 | 3.9 | — | — | 2,300 | 240 | 35 | 312 | 1.8 | 2.5 |
| 4 | 3.1 | 2.2 | — | — | 2,300 | 240 | 35 | 298 | 1.8 | 1.4 |
| 5 | 2.5 | 3.9 | — | — | 2,300 | 240 | 35 | 306 | 1.5 | 2.5 |
| 6 | 4.4 | 2.1 | — | — | 2,100 | 240 | 35 | 308 | 2.7 | 1.4 |
| 7 | 5.0 | 2.0 | — | — | 2,100 | 240 | 35 | 315 | 3.1 | 1.3 |
| 8 | 5.5 | 2.8 | — | — | 2,000 | 240 | 35 | 318 | 3.7 | 1.9 |
| 9 | 3.9 | 4.1 | — | — | 1,900 | 240 | 35 | 309 | 2.4 | 2.7 |
| 10 | 5.1 | 1.9 | — | — | 1,800 | 250 | 35 | 311 | 3.3 | 1.3 |
| 11 | 4.6 | 2.9 | — | — | 1,800 | 250 | 35 | 314 | 3.0 | 2.0 |
| 12 | 4.3 | — | 2.7 | — | 2,100 | 240 | 35 | 305 | 2.7 | — |
| 13 | 3.1 | — | 2.5 | — | 2,100 | 240 | 35 | 298 | 1.9 | — |
| 14 | 4.2 | — | — | 2.2 | 2,300 | 240 | 35 | 320 | 2.4 | — |
| 15 | 4.4 | — | — | 2.5 | 2,300 | 240 | 35 | 300 | 1.8 | — |
| 16 | 3.5 | — | — | 4 | 2,300 | 240 | 35 | 310 | 2.4 | — |

AA = acrylic acid
nBA = n-butyl acrylate

| Example No. | 2-Ethylhexyl acrylate dosage rate (kg/h) | Methyl acrylate dosage rate (kg/h) | TBIN dosage rate (g/h) | PA dosage rate (kg/h) | Output (kg/h) | Conversion (based on ethylene) (%) | Solidification point (°C.) | Hoppler hardness at 23° C. (bar) | Staudinger index |
|---|---|---|---|---|---|---|---|---|---|
| 1 | — | — | 26.6 | 0.57 | 56.6 | 17.7 | 98 | 570 | 27.5 |
| 2 | — | — | 23.2 | 0.75 | 54.5 | 17.8 | 97 | 550 | 25.3 |
| 3 | — | — | 20.0 | 0.92 | 55.6 | 17.8 | 96 | 450 | 19.2 |
| 4 | — | — | 209 | 0.53 | 52.3 | 17.5 | 98 | 570 | 33.6 |
| 5 | — | — | 16.8 | 0.12 | 54.3 | 17.7 | 101 | 610 | 43.5 |
| 6 | — | — | 26.3 | 0.93 | 54.7 | 17.8 | 95 | 370 | 17 |
| 7 | — | — | 29.8 | 1.15 | 56.2 | 17.9 | 94 | 350 | 15.7 |
| 8 | — | — | 39.3 | 1.36 | 57.8 | 18.2 | 93 | 300 | 13.5 |
| 9 | — | — | 23.4 | 1.61 | 55.8 | 18.0 | 92 | 270 | 11.3 |
| 10 | — | — | 139.1 | 1.33 | 58.2 | 18.7 | 90 | 290 | 10.2 |
| 11 | — | — | 85.7 | 1.45 | 59.1 | 18.8 | 90 | 260 | 8.3 |
| 12 | 1.6 | — | 25.9 | 0.95 | 54.8 | 17.9 | 92 | 308 | 17.5 |
| 13 | 1.5 | — | 21.2 | 0.65 | 51 | 17.5 | 92 | 295 | 32 |
| 14 | — | 1.4 | 25 | 0.55 | 55.8 | 17.8 | 99 | 600 | 29 |
| 15 | — | 1.4 | 20.5 | 0.53 | 52.3 | 17.5 | 100 | 630 | 35 |
| 16 | — | 2.5 | 22 | 0.6 | 55.5 | 18 | 100 | 580 | 29 |

TBIN = tert.-butyl perisononanate
PA = propionaldehyde

The wax samples prepared in Experiments 1 to 16 were emulsified, using non-ionic emulsifiers such as fatty alcohol oxyethylates or alkylphenol oxyethylates, in the presence of alkali, to give non-creaming and speck-free highly transparent wax emulsions.

EXAMPLE 17

To emulsify the wax granules obtained from Example 1, 20 parts of wax, 4 parts of a non-ionic emulsifier (an alkylphenol oxyethylate containing from 8 to 10 moles of ethylene oxide, an adduct of straight-chain or branched $C_9/C_{11}$-fatty alcohols with 7 moles of ethylene oxide and an adduct of straight-chain or branched $C_{13}/C_{15}$-fatty alcohols with 10 moles of ethylene oxide), 0.3 part of potassium hydroxide, 0.72 part of ethylene glycol and 30 parts of water were stirred under pressure, at 135°–145° C., to give a homogeneous melt. A further 44 parts of water were then added, with stirring. After a further 15 minutes' stirring, the wax emulsion was cooled rapidly. The emulsion obtained was free from specks and from creaming and showed a light transmission of 66% at 1% dilution in a 1 cm cell. After standing for 2 months, the emulsion was still free from creaming.

When spread on a glass plate, the emulsion formed a film at room temperature; the film was clear, glossy, tough, non-tacky and speck-free, as is desirable for use of the emulsion in polishes.

EXAMPLE 18

To emulsify the wax granules described in Example 2, 25 parts of wax, 4.5 parts of an alkylphenol oxyethylate containing 9 moles of ethylene oxide, 0.375 part of potassium hydroxide, 0.9 part of ethylene glycol and 28 parts of water were introduced into a pressure autoclave fitted with a propellor stirrer, and the mixture was heated to 120°–140° C., with stirring. When stirring had produced a homogeneous melt, a further 41 parts of water were added under pressure. The mixture was once again heated to 130° C., stirred for a further 10-20 minutes and then cooled rapidly to room temperature, with slight stirring.

The wax emulsion obtained was speck-free and showed a light transmission of 65% at 1% dilution.

Even after 2 months' storage, no creaming of the emulsion was observed. When spread on a glass plate, the emulsion dried to give speck-free, clear, tough, glossy and non-tacky films.

EXAMPLE 19

20 parts of wax according to Example 4, 4 parts of isodecyl alcohol oxyalkylated with 7 moles of ethylene oxide, 0.3 part of potassium hydroxide, 1 parts of diethylethanolamine and 30 parts of water were introduced into a 1 liter pressure autoclave fitted with a propellor stirrer, and were stirred at 120°–130° C. under autogenous pressure to give a melt. 45 parts of water were then added under pressure, and the mixture was stirred briefly and then cooled to 40° C., with moderate stirring.

The wax emulsion obtained was speck-free and showed 63% light transmission. After 2 months' storage, no creaming was observed. When spread on a glass plate, the emulsion dried to give speck-free, clear, tough, glossy and non-tacky films.

EXAMPLE 20

160 parts of wax from Example 5, 40 parts of decyl alcohol oxyalkylated with 7 moles of ethylene oxide, 3.5 parts of potassium hydroxide, 1.5 parts of sodium bisulfite and 175 parts of water were introduced into a 1 liter pressure autoclave and stirred at 130° C. to form a homogeneous melt. 263 parts of water were then added under pressure, after which the mixture was stirred for 15 minutes and then cooled to 40° C.

A highly transparent emulsion, with a light transmission of 85%, was obtained.

The emulsion is stable on storage and no creaming was observed after 2 months. When spread on a glass plate, it dried to a speck-free, clear, tough, glossy and non-tacky film.

The waxes according to the invention had the further advantage that in spite of being very hard and in some cases also having a high viscosity, they are simple to emulsify by conventional methods, without use of pressure, and that, unlike the products obtained by melt oxidation, they give colorless emulsions in every case, regardless of whether ionic or non-ionic emulsifiers are used. Examples 21 to 27 illustrate these facts.

EXAMPLE 21

283 parts of water and 8 parts of alkylphenol oxyethylated with 9 moles of ethylene oxide were introduced into an open emulsifying vessel and heated to 95°–98° C.; a wax melt of 40 parts of the wax from Example 9, 0.6 part of potassium hydroxide and 1.2 parts of ethylene glycol was run in, with stirring. On cooling, a wax emulsion which was free from creaming and specks was obtained; at 1% dilution, in a 1 cm cell, the emulsion showed a light transmission of 70%. The wax emulsion is stable on storage for several months and can be employed in the paper industry, textile industry and other branches of chemical technology.

EXAMPLE 22

148 parts of water and 6 parts of olein were introduced into an open emulsifying vessel. 46 parts of a wax melt of 40 parts of the wax from Example 10 and 6 parts of diethylethanolamine were run in slowly at 95°–98° C., with stirring. On completion of the addition, the mixture was cooled to room temperature. A colorless wax emulsion was obtained, which at 1% strength dilution showed a light transmission of 80%.

Further Examples are shown in Table 2 below.

TABLE 2

| Example | Wax from Example No. | Emulsified according to Example No. | Light transmission of the wax emulsion in a 1 cm cell [%] | Color of emulsion | Film formed on a glass plate |
| --- | --- | --- | --- | --- | --- |
| 23 | 11 | 21 | 75 | colorless, with bluish opalescence | colorless, clear |
| 24 | 9 | 22 | 80 | colorless, with bluish opalescence | " |
| 25 | 8 | 21 | 70 | colorless, with bluish opalescence | " |
| 26 | 8 | 22 | 75 | colorless, with bluish opalescence | " |
| 27 | 10 | 21 | 80 | colorless, with | " |

TABLE 2-continued

| Example | Wax from Example No. | Emulsified according to Example No. | Light transmission of the wax emulsion in a 1 cm cell [%] | Color of emulsion | Film formed on a glass plate |
| --- | --- | --- | --- | --- | --- |
| | | | | bluish opalescence | |

TABLE 3

Comparative Examples with prior art waxes

| Example | Wax | Emulsified according to Example No. | Light transmission of the wax emulsion in a 1 cm cell % | Color of emulsion | Film formed on a glass plate |
| --- | --- | --- | --- | --- | --- |
| 28 | oxidized polyethylene wax, acid No. 23 | 21 | 60 | beige | beige, otherwise clear |
| 29 | oxidized polyethylene wax, acid No. 23 | 22 | 80 | beige-yellow | yellowish, clear |
| 30 | oxidized polyethylene wax, acid No. 17 | 21 | 30 | milky | milky, with specks |
| 31 | Example 3 of German Published Application DAS 1,720,232 | 50 | 50 | milky | colorless, clear |

The fields of use of the novel waxes are generally in chemical technology, in the textile industry, in plastics processing and especially in polishes. In primary dispersions of the styrene/acrylic acid/acrylate type, the addition of from 1 40% of an emulsion of the high molecular weight hard wax produces vary glossy and scratch-resistant films on linoleum or PVC floor coverings, with substantial advantages over prior art products.

The Examples which follow illustrate this effect.
General experimental method

A mixture of 40 parts of the wax emulsion according to the invention, 30 parts of a primary dispersion of the styrene/acrylic acid/acrylate type, 17 parts of water, 13 parts of a 15% strength wetting resin solution, 0.3 part of tributoxyethyl phosphate, 0.2 part of tributyl phosphate and 1 part of a fluorine-containing surfactant was used as the basic mixture for the experiments.

The polish mixture was applied to a standard PVC floor covering by means of a paint brush with fine bristles. The mixture dried at room temperature to give a glossy, tough polish film. The gloss of the film was determined by means of a Dr. Lange Universal Reflectometer with 85° measuring head, a black plate being used as the calibration standard, of gloss 50.

The scratch resistance, toughness and soiling of the film were tested by producing a film on white PVC and scraping it with a black heel. The marking with black heel rubber, and the tearing of the film, were assessed. 1 means no marking with black heel rubber and no damage to the film, whilst 5 means severe black streaks and tearing of the polymer film.

The Table which follows shows the performance of the waxes according to the invention in simple polish formulations.

TABLE 4

| Example | Emulsion from Example | Gloss, 1st coat | Gloss, 2nd coat | Black marks | Damage to film by scraping with heel |
| --- | --- | --- | --- | --- | --- |
| 32 | 17 | 20 | 39 | 2 | 1 |
| 33 | 18 | 21 | 40 | 2 | 1 |
| 34 | 19 | 19 | 39 | 2 | 1 |
| 35 | 20 | 17 | 36 | 2-3 | 2 |

The Table which follows shows comparative experiments with prior art wax emulsions in simple polish formulations.

TABLE 5

| Example | Emulsion from Example | Gloss, 1st coat | Gloss, 2nd coat | Black marks | Damage to film by scraping with heel |
| --- | --- | --- | --- | --- | --- |
| 36 | 31 | 15 | 30 | 4 | 3 |
| 37 | 29 | 17 | 36 | 4 | 4 |
| 38 | 28 | 16 | 37 | 4 | 3-4 |

We claim:

1. A water-emulsifiable hard wax consisting of homogeneous terpolymers of ethylene with—based on weight of terpolymer—from 1 to 8% by weight of $C_3$-$C_8$-olefinically unsaturated carboxylic acids and from 0.5 to 10% by weight of $C_1$-$C_{12}$-alkyl esters of such unsaturated carboxylic acids and having a Staudinger index, determined according to DIN 53,728, of from 5 to 55, an acid number of from 8 to 62 and a Höppler hardness, measured by DFG standard method M-III-9a(57), at 23° C., of from 250 to 800 bar.

2. A hard wax as claimed in claim 1, prepared by copolymerizing ethylene with olefinically unsaturated $C_3$-$C_8$-carboxylic acids and esters of such acids with $C_1$-$C_{12}$-alkanols in a continuous process in the presence of a free radical initiator at from 150° to 300° C. and under a pressure of from 1,000 to 3,000 bar, using a weight ratio of ethylene:acid:acrylate of from 500:1:1 to 20:1:1, in a one-phase polymerization medium in which the monomers are soluble, in the presence of from 0.01 to 8% by weight, based on the sum of the monomers, of a regulator, from 3 to 25% by weight of the ethylene being converted and the copolymer formed being removed continuously from the reaction zone.

* * * * *